(12) United States Patent
Kodaka et al.

(10) Patent No.: US 8,388,498 B2
(45) Date of Patent: Mar. 5, 2013

(54) CONTROL SYSTEM FOR WORK VEHICLE

(75) Inventors: Katsuaki Kodaka, Abiko (JP); Hidetoshi Satake, Ishioka (JP); Kazuhiro Ichimura, Kasumigaura (JP)

(73) Assignee: Hitachi Construction Machinery Co., Ltd., Tokyo (JP)

( * ) Notice: Subject to any disclaimer, the term of this patent is extended or adjusted under 35 U.S.C. 154(b) by 591 days.

(21) Appl. No.: 12/519,101

(22) PCT Filed: Dec. 12, 2007

(86) PCT No.: PCT/JP2007/073953
§ 371 (c)(1),
(2), (4) Date: Jun. 12, 2009

(87) PCT Pub. No.: WO2008/072662
PCT Pub. Date: Jun. 19, 2008

(65) Prior Publication Data
US 2010/0016123 A1    Jan. 21, 2010

(30) Foreign Application Priority Data
Dec. 15, 2006    (JP) ................................. 2006-337935

(51) Int. Cl.
*B60W 10/04* (2006.01)
*B60W 10/18* (2012.01)

(52) U.S. Cl. ........ 477/186; 477/190; 477/192; 477/195; 477/197; 303/191; 303/138

(58) Field of Classification Search .................. 477/186, 477/190, 192, 195, 197; 303/191, 138, 139, 303/155, 157, 158
See application file for complete search history.

(56) References Cited

U.S. PATENT DOCUMENTS

| | | | | |
|---|---|---|---|---|
| 4,310,064 A * | 1/1982 | Kazarian, Jr. | ................. | 180/271 |
| 5,277,269 A * | 1/1994 | Ichimura et al. | .............. | 180/306 |
| 6,332,654 B1 | 12/2001 | Yano | | |
| 7,055,916 B2 * | 6/2006 | Inoue | ......................... | 303/116.1 |
| 2003/0173824 A1 | 9/2003 | Ishimaru et al. | | |
| 2005/0029859 A1 * | 2/2005 | Bensch et al. | ................... | 303/89 |
| 2005/0173977 A1 * | 8/2005 | Fischer | ........................... | 303/89 |
| 2006/0186731 A1 * | 8/2006 | Bach | ............................... | 303/89 |
| 2007/0090691 A1 * | 4/2007 | Maskell et al. | ................. | 303/192 |

FOREIGN PATENT DOCUMENTS

| | | |
|---|---|---|
| CN | 1535225 A | 10/2004 |
| CN | 1874918 A | 12/2006 |
| EP | 1 321 340 A1 | 6/2003 |
| JP | 59-124761 U | 8/1984 |

(Continued)

OTHER PUBLICATIONS

International Search Report dated Jan. 22, 2008 (two (2) pages).

(Continued)

*Primary Examiner* — Tisha Lewis
(74) *Attorney, Agent, or Firm* — Crowell & Moring LLP

(57) ABSTRACT

A control system for a work vehicle includes: a negative-type parking brake device that starts operating in response to a parking brake instruction; an output device that outputs the parking brake instruction; a service brake device that operates in response to an operation of a brake pedal by an operator; and a brake control device that operates the service brake device regardless of a pedal operation by the operator when the parking brake instruction is output from the output device.

14 Claims, 4 Drawing Sheets

(a)

(b)

FOREIGN PATENT DOCUMENTS

| | | |
|---|---|---|
| JP | 2-114046 A | 4/1990 |
| JP | 5-116605 A | 5/1993 |
| JP | 8-48222 A | 2/1996 |
| JP | 2002-79931 A | 3/2002 |
| JP | 2005067496 A * | 3/2005 |

OTHER PUBLICATIONS

Extended European Search Report dated Feb. 23, 2011 (six (6) pages).

* cited by examiner (a)

(b)

CONTROL SYSTEM FOR WORK VEHICLE

TECHNICAL FIELD

The present invention relates to a control system for a work vehicle such as a wheel hydraulic excavator and a wheel loader.

BACKGROUND ART

There is a brake release device for a work vehicle with a negative-type parking brake known in the related art, in which brake release pressure is supplied from a hydraulic power source so as to release the parking brake and the brake release pressure is stopped supplying so as to operate the parking brake (refer to, for instance, patent reference literature 1). The brake release device in patent reference literature includes a first and a second clutch devices in a transmission, engages both of the clutch devices in response to an operation instruction for parking brake so as to lock the transmission, and activates the parking brake.

Patent reference literature 1: Japanese Laid Open Patent Publication No. 2002-79931

DISCLOSURE OF THE INVENTION

Problems to be Solved by the Invention

The negative-type parking brake, however, has a time lag between output of an operation instruction for parking brake and full operation of the parking brake. This bothers an operator to keep operating a brake pedal until the parking brake fully works, for instance, when the operator wishes to operate the parking brake while going downhill.

Means for Solving the Problems

A control system for a work vehicle according to the present invention comprises: a negative-type parking brake device that starts operating in response to a parking brake instruction; an output device that outputs the parking brake instruction; a service brake device that operates in response to an operation of a brake pedal by an operator; and a brake control device that operates the service brake device regardless of a pedal operation by the operator when the parking brake instruction is output from the output device.

It is possible that the brake control device operates the service brake device for a predetermined length of time when the parking brake instruction is output from the output device.

In this case, it is preferable that the predetermined length of time is set to a length of time required from when the parking brake device starts operating in response to an output of the parking brake instruction until when parking brake force increases to a predetermined value.

It is preferable to further comprises an oil temperature detection device that detects temperature of pressure oil that causes brake release pressure to act on the parking brake device; and that the brake control device sets the predetermined length of time shorter as oil temperature detected by the oil temperature detection device is higher.

A pedal operation detection device that detects an operation of the brake pedal may be further provided and the brake control device may operate the brake device regardless of the pedal operation by the operator when a predetermined pressing operation is detected by the pedal operation detection device, even if the parking brake instruction is not output from the output device.

In this case, it is preferable that the predetermined pressing operation is a maximum pressing operation.

A vehicle speed detection device that detects a vehicle speed may be further provided and the brake control device may allow an operation of the service brake device upon an output of the parking brake instruction when the vehicle speed detected by the vehicle speed detection device is less than a predetermined value, and disallow an operation of the service brake device upon an output of the parking brake instruction when the vehicle speed is more than the predetermined value.

The parking brake device may comprise a transmission that is provided with a first negative-type clutch device and a second negative-type clutch device that transmit power for traveling to an axle; and the transmission may engage simultaneously the first clutch device and the second clutch device so as to stop rotation of the axle, when the parking brake instruction is output.

Each of the first clutch device and the second clutch device may be engaged by biasing force of a spring and be released by oil pressure.

When the first clutch device is released and the second clutch device is engaged, the transmission may be set to a first gear ratio, and when the first clutch device is engaged and the second clutch device is released, the transmission may be set to a second gear ratio which is smaller than the first gear ratio.

It is preferable that a traveling work vehicle comprises the control system described above; a traveling device that rotates wheels using a hydraulic motor; and an excavating device.

Advantageous Effect of the Invention

According to the present invention, a service brake device is operated regardless of the pedal operation by an operator when a parking brake instruction is output. This allows the operator to operate the parking brake easily without operating the brake pedal, for example, when going downhill.

BEST MODE FOR CARRYING OUT THE INVENTION

Next, with reference to the accompanying FIGS. 1 through 4, an embodiment of a control system for a work vehicle in accordance with the present invention will be described in detail.

Figure 1:
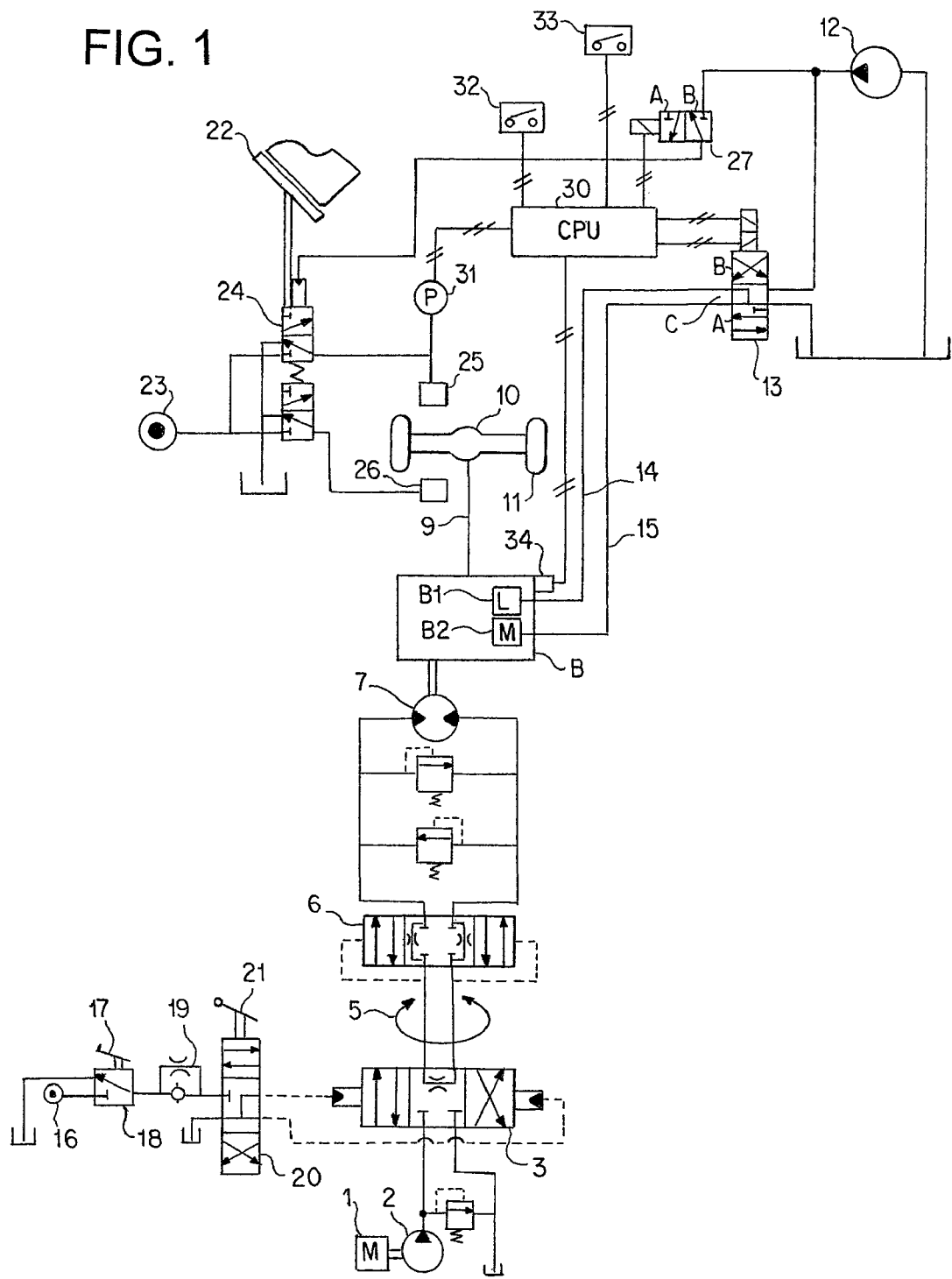
FIG. 1 shows a diagram of a control system for a work vehicle according to an embodiment of the present invention.

FIG. 1 is a diagram of a control system according to the present embodiment, showing mainly a hydraulic circuit for traveling. The control system is provided in a work vehicle equipped with tires for traveling in workplaces or open roads. This sort of work vehicle includes a hydraulic excavator, a wheel loader, and so on, and is provided with an excavating device including a boom and a bucket. The excavating device is driven by a hydraulic actuator such as a hydraulic cylinder.

Direction and flow rate of oil discharged from a main pump 2 that is driven by an engine (prime mover) 1 are controlled by a control valve 3. The discharged oil passes through a center joint 5 and is supplied to a traveling motor 7 via a counter balance valve 6. A rotation speed of the traveling motor 7 is changed by a transmission 8 and is transmitted to tires 11 via a shaft 9 and an axle 10. A work vehicle thus travels.

The transmission 8, which is publicly known, includes a planetary reduction mechanism that consists of a sun gear, a planetary gear and a ring gear, and clutches 81 and 82 that are provided to the sun gear and the ring gear respectively. Each of the clutches 81 and 82 is provided with a clutch cylinder that includes a spring. The clutch cylinder is pressed onto a disk by biasing force of the spring so as to engage the corresponding clutch 81 or 82. Pressing force of the clutch cylinder is eliminated by oil pressure from a hydraulic power source 12 that acts against spring force so as to release the clutch 81 or 82. The oil pressure that acts on the clutches 81 and 82 is controlled by drive of a solenoid switch valve 13. A sort of clutch that is engaged by biasing force of a spring and is released by oil pressure is called a negative-type clutch.

The solenoid switch valve 13 is switched over in response to a control signal from a CPU 30 (controller). It should be noted that although the controller includes a processing unit that includes the CPU 30, ROM, RAM, and other peripheral circuits, only the CPU 30 is shown in FIG. 1 as a representative of the controller. When the solenoid switch valve 13 is switched to position A, pressure oil from the hydraulic power source 12 acts on the clutch 81 via a line 14. This releases the clutch 81 and engages the clutch 82 so as to set the transmission 8 to a predefined gear ratio R1 (low gear). Power for traveling by rotation of the traveling motor 7 is transmitted to the shaft 9, enabling the vehicle to travel in a first speed with low speed and high torque. When the solenoid switch valve 13 is switched to position B, pressure oil from the hydraulic power source 12 acts on the clutch 82 via a line 15. This releases the clutch 82 and engages the clutch 81 so as to set the transmission 8 to a predefined gear ratio R2 (high gear), enabling the vehicle to run in a second speed with high speed and low torque. The gear ratio R1 is larger than the gear ratio R2.

When the solenoid switch valve 13 is switched to position C, the lines 14 and 15 are communicated with a reservoir. In this case, the clutches 81 and 82 are engaged by spring forces. Therefore, the transmission 8 is locked and rotation of the shaft 9 is stopped. According to the present embodiment, the clutches 81 and 82 that stop rotation of the shaft 9 are used for a parking brake. In order to release the parking brake, either the clutch 81 or the clutch 82 is released by acting pressure oil (brake release pressure) on either the clutch 81 or the clutch 82. A sort of brake that is operated by biasing force of a spring and is released by oil pressure is called a negative-type parking brake.

In such a parking brake, pressure in the clutches 81 and 82 does not match with a reservoir pressure immediately even if the solenoid switch valve 13 is switched to position C. Operation of the parking brake is thus delayed. An accumulator may be provided in the lines 14 and 15 between the transmission 8 and the solenoid switch valve 13 through a restrictor. In this case, operation of the parking brake will be delayed more.

A pilot circuit for traveling includes a pilot hydraulic power source 16 that is driven by the engine 1 and generates pressure oil, a traveling pilot valve 18 that generates pilot secondary pressure in response to depressing of an accelerator pedal 17, a slow return valve 19 that is provided after the pilot valve 18 and delays return oil to the pilot valve 18, and a forward-reverse switching valve 20 for selecting forward travel, backward travel, or neutral of the vehicle, which is connected to the slow return valve 19. The forward-reverse switching valve 20 is switched over by operation of a control lever 21. Pilot pressure from the pilot hydraulic power source 16 acts on a pilot port of the control valve 3 and drives the control valve 3. Stroke of the control valve thus driven is controlled by the accelerator pedal 17 so as to adjust the travel speed of the vehicle.

The work vehicle is provided with a known hydraulic foot brake (service brake) that exerts a decelerating force in response to operation of a brake pedal 22. A pilot circuit for the foot brake includes a pilot hydraulic power source 23 that is driven by the engine 1 and generates pressure oil, and a brake valve 24 that generates pilot secondary pressure (brake working pressure) in response to depressing of the brake pedal 22. By operating the brake pedal 22, the brake working pressure from the brake valve 24 acts on a front wheel brake device 25 and a rear wheel brake device 26. The brake devices 25 and 26 thus work in response to operation of the pedal and are used as a service brake during running.

The brake valve 24 is connected with the hydraulic power source 12 through a solenoid valve 27. The solenoid valve 27 is switched over in response to a signal from the CPU 30. When the solenoid valve 27 is switched to position A, pilot pressure from the hydraulic power source 12 acts on the brake valve 24. The brake valve 24 is thus driven to causes pressure oil from the hydraulic power source 23 to act on the brake devices 25 and 26. The brake devices 25 and 26 thus work without the operator operating the brake pedal 22, and can be used as a work brake during working such as an excavating operation.

When the solenoid valve 27 is switched to position B, on the other hand, pilot pressure from the hydraulic power source 12 stops acting on the brake valve 24. In this state the work brake is released and the brake devices 25 and 26 are operated by the brake pedal 22. Switching the solenoid valve 27 to position A results in immediate operations of the brake devices 25 and 26, that is, the work brake performs with a better response than that of the parking brake. The solenoid valve 27 is switched to position A or B by, for example, turning on or off a work brake which is not figured herein.

The solenoid switch valve 13 and the solenoid valve 27 are controlled by the CPU 30. The CPU 30 is connected with a pressure sensor 31 that detects brake working pressure from the brake valve 24, that is, operation of the brake pedal 22, a parking brake switch 32 that instructs operation of the parking brake, a speed change switch 33 that instructs to change speed between the first speed and the second speed, and a vehicle speed sensor 34 that detects vehicle speed. The following processing is performed in the CPU 30.

Figure 2:
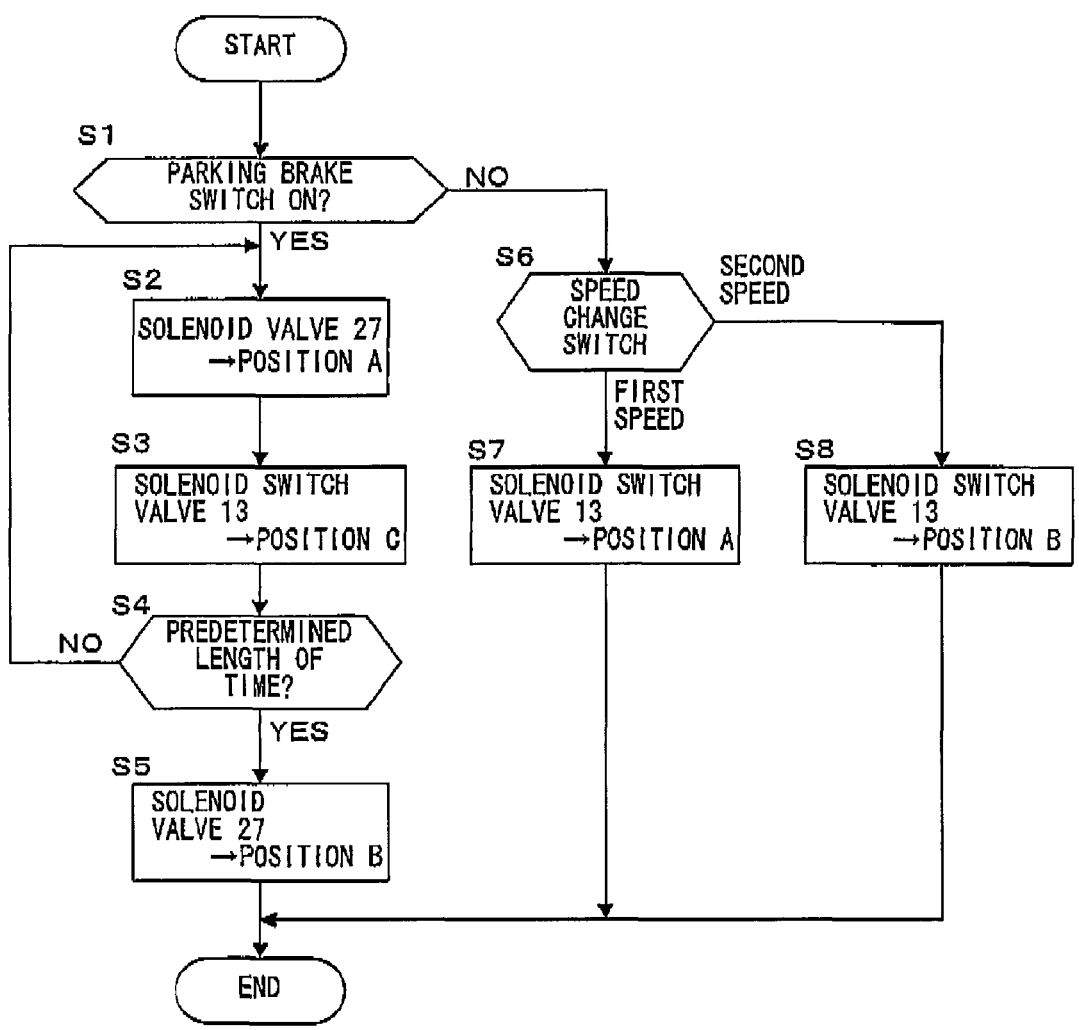
FIG. 2 is a flowchart that shows an example of processing performed in a CPU in FIG. 1.
Figure 3:
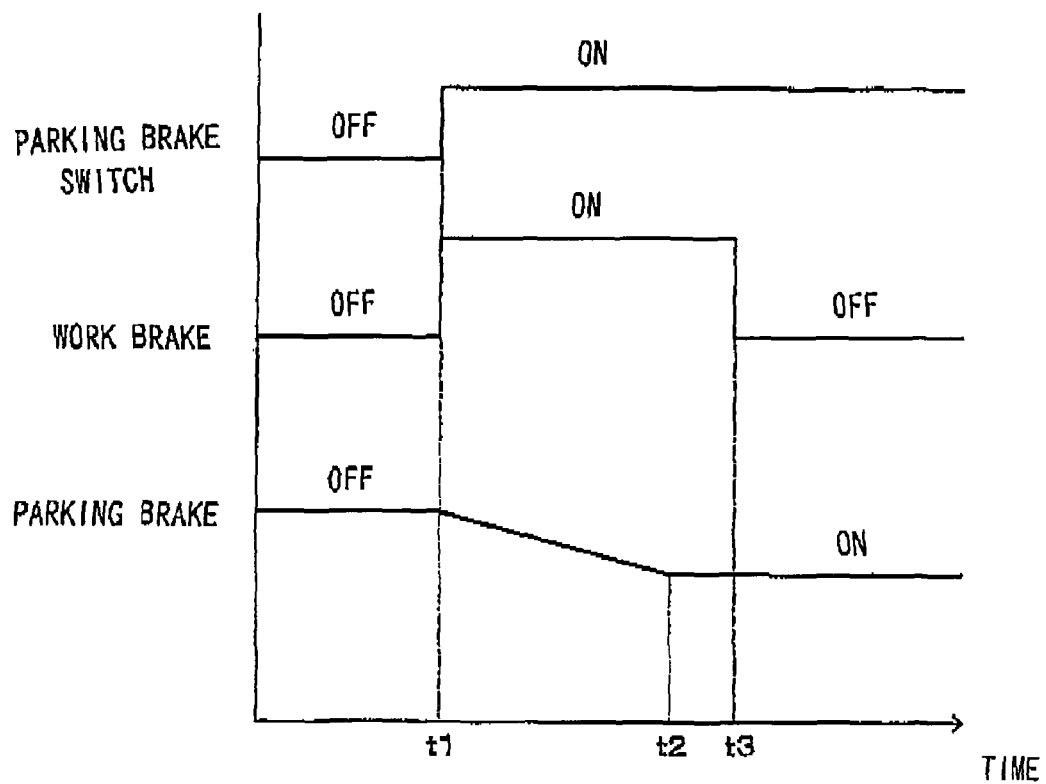
FIG. 3 illustrates operations of the control system according to the embodiment of the present invention.
Figure 3:
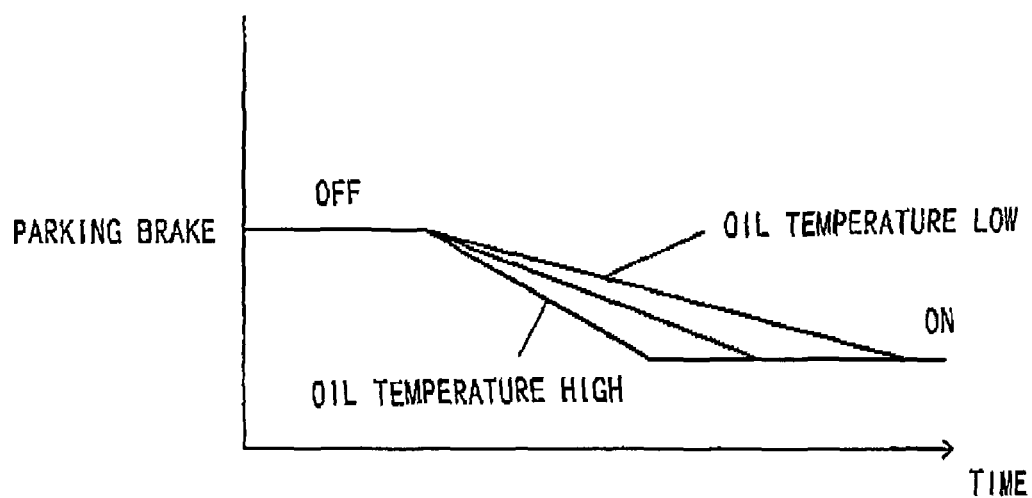

FIG. 2 is a flowchart that shows an example of processing performed in the CPU 30. The flowchart starts in response to, for instance, switching on an engine key switch. In an initial state the solenoid valve 27 is switched to position B. In step S1, it is determined whether the parking brake switch 32 is on or not. If it is determined that the parking brake switch 32 is off, operation proceeds to step S6 so as to determine operation of the speed change switch 33. If it is determined that the speed change switch 33 instructs to select the first speed, operation proceeds to step S7, and the solenoid switch valve 13 is switched to position A. If it is determined that the speed change switch 33 instructs to select the second speed, operation proceeds to step S8, and the solenoid switch valve 13 is switched to position B.

If, on the other hand, it is determined that the parking brake switch 32 is turned on in step S1, operation proceeds to step S2, and the solenoid valve 27 is switched to position A so as to operate a work brake. Then, the solenoid switch valve 13 is switched to position C in step S3 so that pressure oil from the hydraulic power source 12 is stopped acting on the clutches 81 and 82.

In step S4, it is determined whether or not a predetermined length of time has passed since the parking brake switch 32 is switched on. The predetermined length of time is set in advance to substantially correspond to a length of time between when the parking brake switch 32 is switched on and when pressure in the clutches 81 and 82 becomes equal to a reservoir pressure, in other words, a length of time from when the parking brake starts operating until when the parking brake operates fully. If step S4 is negated, operation returns to step S2, and the same processing is repeated. If step S4 is affirmed, operation proceeds to step S5, and the solenoid valve 27 is switched to position B so as to release the work brake.

The characteristic operations of the control system for the work vehicle in accordance with the present embodiment are now explained.

(1) At Running

When the speed change switch 33 instructs to select the first speed while the parking brake switch 32 is switched off, the solenoid switch valve 13 is switched to position A, and pressure oil from the hydraulic power source 12 acts on the clutch 81 via the line 14 (step S7). This releases the clutch 81, engages the clutch 82 and sets the transmission 8 to a predefined gear ratio R1 so that the vehicle is enabled to travel in the first speed with low speed and high torque in response to operation of the accelerator pedal 17. When the speed change switch 33 instructs to select the second speed, the solenoid switch valve 13 is switched to position B, and pressure oil from the hydraulic power source 12 acts on the clutch 82 via the line 15 (step S8). This releases the clutch 82, engages the clutch 81 and sets the transmission 8 to a predefined gear ratio R2 so that that vehicle is enabled to travel in the second speed with high speed and low torque. If the brake pedal 22 is operated while the vehicle is traveling, pressure oil from the hydraulic power source 23 acts on the brake devices 25 and 26, and the vehicle speed is reduced in accordance with operation amount of the brake pedal 22.

(2) At Parking

Operations at parking are now described with a timeline chart in FIG. 3(a). In FIG. 3(a), "work brake" indicates oil pressure that acts on the brake devices 25 and 26, while "parking brake" indicates oil pressure that acts on the clutches 81 and 82. Brake force of the work brake increases with an increase in oil pressure that acts on the brake devices 25 and 26, while brake force of the parking brake increases with an decrease in oil pressure that acts on the clutches 81 and 82.

While the vehicle is stopped, for instance, if the parking brake switch 32 is switched on with a work brake switch turned off (time point t1), the solenoid valve 27 is switched to position A, and the solenoid switch valve 13 is switched to position C (steps S2 and S3). This causes the pressure oil from the hydraulic power source 23 to act on the brake devices 25 and 26 so as to activate the work brake. Since the pressure oil stops acting on the clutch 81 or 82, pressing force from the clutch cylinder is acted on the disk so that the parking brake starts operating. At time point t2, the parking brake force is maximized and the parking brake operates fully (or is turned on). At time point t3, after a predetermined length of time has passed since the parking brake switch 32 is switched on, the solenoid valve 27 is switched to position B (step S5). Thus the work brake is released (or turned off).

The work brake is switched on by the operation of the parking brake switch 32 and is switched off after a predetermined length of time so as to stop motion of the vehicle even before the parking brake operates fully. This prevents the vehicle from moving undesirably when the parking brake is operated, for example, on a slope. An operator thus does not have to continuously operate the brake pedal 22 until the parking brake works fully and operation of the parking brake is facilitated.

According to the embodiment, the following operational effects can be achieved.

(1) It is configured that the operation of the parking brake switch 32 causes the work brake to be operated at the same time the operation of the parking brake is started. This causes the work brake to stop motion of the vehicle even if operation of the negative-type parking brake device delays. The vehicle is thus prevented from moving accidentally, for example, on a slope. In the case where an operator leaves the vehicle immediately after operating the parking brake switch 32, the vehicle will not move. Thus the safety is increased.

(2) Since the work brake is released after a predetermined length of time from the operation of the parking brake switch 32, the operating time of the work brake is minimized. Consequently, a length of time for the parking brake and the work brake to operate concurrently is shortened. Therefore, strong force caused by, for instance, backlash of the gear due to the work brake can be prevented from acting on the parking brake.

(3) The transmission 8 is configured to have function of a parking brake. Therefore, a separate parking brake is not required. This reduces the number of parts.

In FIG. 3(a), the work brake is released after the parking brake operates fully. However, the work brake may be released before the parking brake operates fully. In other words, as long as a force of the parking brake reaches a certain level, the work brake can be released substantially without problems. Therefore, a predetermined length of time is not limited to that described above. The flow velocity of pressure oil from the clutches 81 and 82, that is, response of the parking brake varies depending on oil temperature. An oil temperature sensor, for example, may detect the oil temperature in the lines 14 and 15 so as to vary a predetermined length of time for the operation of the work brake depending on the oil temperature. In this case, as shown in FIG. 3(b), the length of time before the parking brake operates fully is reduced since the oil becomes less viscous as the oil temperature becomes higher. Therefore, the predetermined length of time may be set shorter if the oil temperature is higher.

Figure 4:
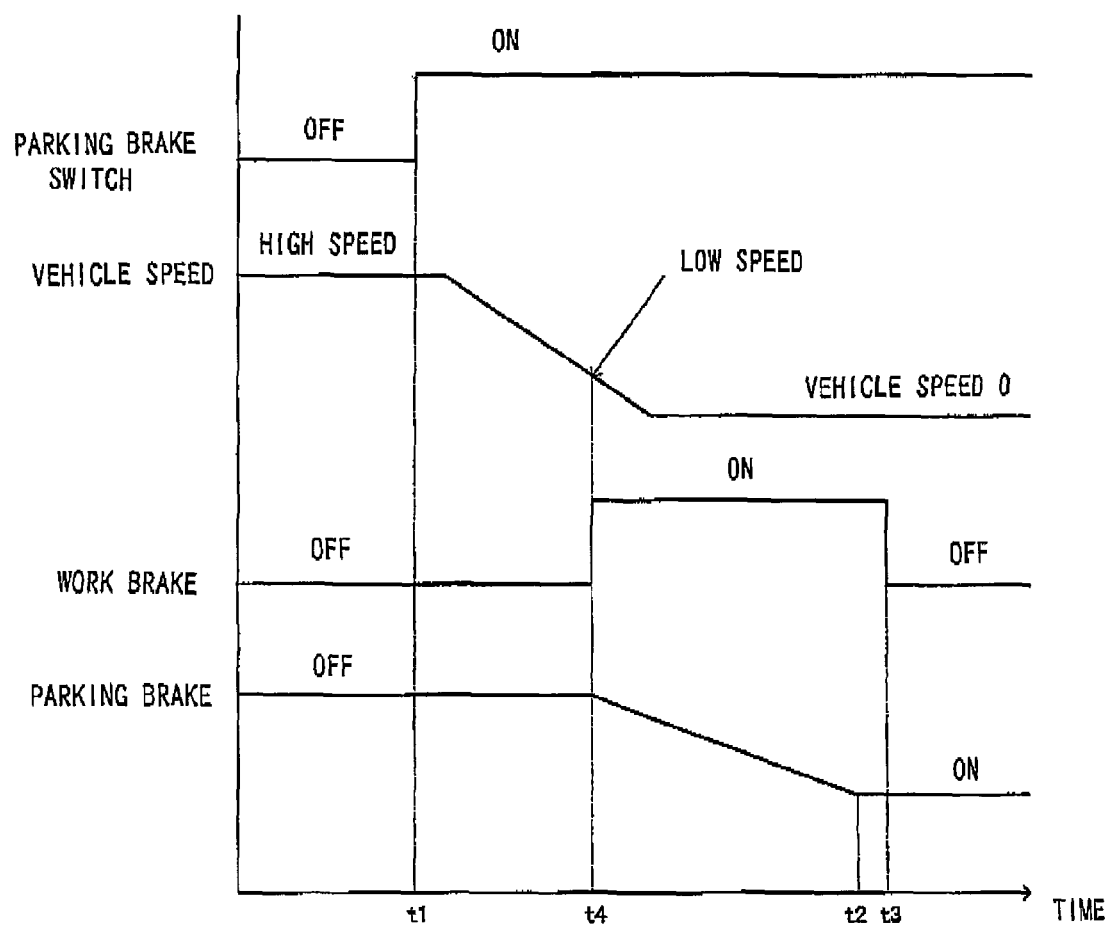
FIG. 4 illustrates an example of variations of FIG. 3.

Instead that the solenoid valve 27 and the solenoid switch valve 13 are switched over immediately after the parking brake switch 32 is switched on, they may be switched over when the vehicle speed sensor 34 detects a vehicle speed of less than a predetermined speed. Thus, as shown in FIG. 4, in the case where the parking brake switch 32 is operated while the vehicle runs at a speed higher than a predetermined speed, neither the work brake nor the parking brake operates. At time point t4, when the vehicle runs at a speed lower than the predetermined speed, the work brake operates and the parking brake starts operating. This prevents sudden braking in running at high speed.

In the above embodiment, the solenoid valve 27 is switched to position A in response to the work brake switch being switched on so as to operate the work brake. However, the solenoid valve 27 may be switched to position A when a predetermined pedal operation is performed or when a predetermined vehicle state is realized. The solenoid valve 27 may be switched to position A and the work brake may be operated, if the brake pedal 22 is pressed more than a predetermined amount (for example, in a maximum pressing operation), for instance, in a state where the vehicle speed is less than a predetermined speed. This allows an operator to operate the work brake with only the operation of the brake pedal 22 without releasing his/her hand from the operation lever. Thus, burdensome operations are not required. The solenoid valve 27 may be switched to position B and the work brake may be released, when the brake pedal 22 is pressed again more than a predetermined amount after the operation of the brake pedal 22 is stopped with the work brake operating.

The pressing operation on the brake pedal 22 with more than a predetermined amount (for example, maximum pressing operation) is detected by the pressure sensor 31. The work brake may be operated or released when the pressing operation with more than the predetermined amount is performed continuously for a predetermined length of time. This does not allow the work brake to be operated or released even if the operator operates the brake pedal 22 momentarily. Frequent operation/release of the work brake is thus prevented. A pedal operation detection device other than a pressure sensor may be used.

In the above embodiment, a parking brake device includes the clutch 81 (first clutch device) and the clutch 82 (second clutch device) of the transmission 8. However, a parking brake may be configured separately from the clutches 81 and 82. A configuration of a parking brake device is not limited to that described above. In the above embodiment, a parking brake instruction is to be output from the parking brake switch 32. However, it may be output from another output device. In the above embodiment, the solenoid valve 27 is to be switched over in response to the parking brake switch 32 being switched on, and the brake devices 25 and 26 are to be operated regardless of operation of the brake pedal 22. However, a configuration of a brake control device is not limited to that described above. A work brake may be configured separately from the brake devices 25 and 26. A service brake device may not necessarily be used as a work brake. In the above embodiment, a clutch device is configured to release the clutch 81 and engage the clutch 82 for setting the transmission 8 to the gear ratio R1 (first gear ratio), and to engage the clutch 81 and release the clutch 82 for setting the transmission 8 to a gear ratio R2 (second gear ratio). However, a configuration of the clutch device is not limited to that described above.

In the above embodiment, a length of time from when the parking brake starts working until when the parking brake works fully is set as a predetermined length of time, and the work brake (service brake device) is controlled to operate for the predetermined length of time. However, the predetermined length of time is not limited to that described above. For example, a length of time until the parking brake force exceeds a certain level may be set as the predetermined length of time. Operations of the work brake may be controlled in accordance with a physical quantity correlative to the parking brake force. Parameter may be a physical quantity other than a length of time. For instance, by configuring to detect oil pressure acting on the clutches 81 and 82, when the detected oil pressure is less than a predetermined value, the solenoid valve 27 may be switched to position B so as to switch the work brake off. The present invention is not limited to the control system for a work vehicle in accordance with the above embodiments as long as the characteristic features and functions of the present invention can be achieved.

The disclosure of the following priority application is herein incorporated by reference: Japanese Patent Application No. 2006-337935 field Dec. 15, 2006.

The invention claimed is:

1. A control system for a work vehicle, comprising:
a negative parking brake device that starts operating in response to a parking brake instruction, with the parking brake device having a time lag between the parking brake instruction and full operation of the parking brake device;
a parking brake switch that outputs the parking brake instruction;
a service brake device that operates in response to an operation of a brake pedal by an operator; and
a brake control device that operates the service brake device regardless of a pedal operation by the operator after the parking brake instruction is output from the parking brake switch, until a parking brake force increases to a predetermined value.

2. A control system for a work vehicle according to claim 1, wherein:
the brake control device operates the service brake device for a predetermined length of time when the parking brake instruction is output from the parking brake switch.

3. A control system for a work vehicle according to claim 2, wherein:
the predetermined length of time is set to a length of time required from when the parking brake device starts operating in response to an output of the parking brake instruction until when parking brake force increases to the predetermined value.

4. A control system for a work vehicle according to claim 2, further comprising:
an oil temperature detection device that detects temperature of pressure oil that causes brake release pressure to act on the parking brake device; wherein:
the brake control device sets the predetermined length of time shorter as oil temperature detected by the oil temperature detection device is higher.

5. A control system for a work vehicle according to claim 1, comprising:
a pedal operation detection device that detects an operation of the brake pedal; wherein:
the brake control device operates the service brake device regardless of the pedal operation by the operator when a predetermined pressing operation is detected by the pedal operation detection device, even if the parking brake instruction is not output from the parking brake switch.

6. A control system for a work vehicle according to claim 5, wherein:
the predetermined pressing operation is a maximum pressing operation.

7. A control system for a work vehicle according to claim 1, further comprising:
a vehicle speed detection device that detects a vehicle speed; wherein:
the brake control device allows an operation of the service brake device upon an output of the parking brake instruction when the vehicle speed detected by the vehicle speed detection device is less than a predetermined value, and disallows an operation of the service brake device upon an output of the parking brake instruction when the vehicle speed is more than the predetermined value.

8. A control system for a work vehicle according to claim 1, wherein:
the parking brake device comprises a transmission that is provided with a first negative clutch device and a second negative clutch device that transmit power for traveling to an axle; and the transmission engages simultaneously the first clutch device and the second clutch device so as to stop rotation of the axle, when the parking brake instruction is output.

9. A control system for a work vehicle according to claim 8, wherein:
each of the first clutch device and the second clutch device is engaged by biasing force of a spring and is released by oil pressure.

10. A control system for a work vehicle according to claim 8, wherein:
when the first clutch device is released and the second clutch device is engaged, the transmission is set to a first gear ratio, and when the first clutch device is engaged and the second clutch device is released, the transmission is set to a second gear ratio which is smaller than the first gear ratio.

11. A traveling work vehicle, comprising:
a control system according to claim 1;
a traveling device that rotates wheels using a hydraulic motor; and
an excavating device.

12. A control system for a work vehicle according to claim 3, further comprising:
an oil temperature detection device that detects temperature of pressure oil that causes brake release pressure to act on the parking brake device; wherein:
the brake control device sets the predetermined length of time shorter as oil temperature detected by the oil temperature detection device is higher.

13. A control system for a work vehicle according to claim 2, comprising:
a pedal operation detection device that detects an operation of the brake pedal; wherein:
the brake control device operates the service brake device regardless of the pedal operation by the operator when a predetermined pressing operation is detected by the pedal operation detection device, even if the parking brake instruction is not output from the parking brake switch.

14. A control system for a work vehicle according to claim 3, comprising:
a pedal operation detection device that detects an operation of the brake pedal; wherein:
the brake control device operates the service brake device regardless of the pedal operation by the operator when a predetermined pressing operation is detected by the pedal operation detection device, even if the parking brake instruction is not output from the parking brake switch.

* * * * *